United States Patent
Weh et al.

[11] Patent Number: 5,927,683
[45] Date of Patent: Jul. 27, 1999

[54] RAPID CONNECTION COUPLING

[75] Inventors: Wolfgang Weh; Erwin Weh, both of Illertissen, Germany

[73] Assignee: Weh GmbH, Verbindungstechnik, Illertissen, Germany

[21] Appl. No.: 08/875,163

[22] PCT Filed: Jan. 18, 1996

[86] PCT No.: PCT/EP96/00205

§ 371 Date: Jul. 18, 1997

§ 102(e) Date: Jul. 18, 1997

[87] PCT Pub. No.: WO96/22488

PCT Pub. Date: Jul. 25, 1996

[30] Foreign Application Priority Data

Jan. 19, 1995 [DE] Germany ................. 295 00 808 U

[51] Int. Cl.⁶ ................................................. F16L 37/28
[52] U.S. Cl. ................... 251/149.6; 285/35; 285/101; 285/316
[58] Field of Search .................... 285/101, 102, 285/34, 35, 306, 23, 316, 315; 251/149.6

[56] References Cited

U.S. PATENT DOCUMENTS

| | | | |
|---|---|---|---|
| 2,754,135 | 7/1956 | Kramer | 285/101 |
| 3,825,223 | 7/1974 | Richardson | 285/101 X |
| 5,209,528 | 5/1993 | Weh et al. | 285/316 X |
| 5,290,009 | 3/1994 | Heilmann | 285/316 X |
| 5,390,963 | 2/1995 | Namekawa | 285/316 X |

FOREIGN PATENT DOCUMENTS 1559236   4/1990   U.S.S.R. .................. 285/315

Primary Examiner—Dave W. Arola
Attorney, Agent, or Firm—Knobbe, Martens, Olson & Bear LLP

[57] ABSTRACT

The invention concerns a rapid connection coupling (10) for transferring gases and/or liquid, in particular for coolant filling operations in air conditioning systems. The coupling in question comprises the following elements: a tubular housing (11), an outer sliding sleeve (18) which can slide relative to the housing (11); a number of radially expanding collet chuck elements (15) mounted on the housing (11) and provided with an engaging contour (17) which facilitates connection to a matching connection nipple (30); and a sealing piston (22) capable of sliding centrally inside the housing (11), the said sealing piston being brought into contact with the connecting nipple (30). To ensure easy handling, it is proposed that a sliding ring (40) which can slide independently and is acted on by a spring should be provided between the sealing piston (22) and the collet chuck elements (15); the sliding ring engages with the collet chuck elements (15) and keeps them in the open position when the plug-in connection coupling (10) is in the uncoupled position, and is so fitted as to be capable during the coupling action of sliding with the sealing piston (22) to break the engagement with the collet chuck elements (15).

20 Claims, 2 Drawing Sheets

RAPID CONNECTION COUPLING

DESCRIPTION

This invention relates to a rapid connection coupling for transferring gaseous and/or liquid fluids, especially for charging coolants in air-conditioning systems.

A reliable, tight and rapidly connected plug-in coupling should be effected with such rapid connection couplings for transferring a fluid from a pressure source, for example a refill cylinder. Simple, problem-free operation of the rapid connection coupling is particularly important, so that problem-free handling is facilitated even under unfavourable conditions, such as dangerous fluids or at high connection pressures.

Such a rapid connection coupling is described in EP-A 0 340 879, wherein the rapid connection coupling has a housing with a fluid inlet and a fluid outlet, while a plurality of valves are provided in order to ensure reliable sealing of the rapid connection coupling right up to complete production of the connection. These valves are operated in a specific, predetermined sequence after fitting of the rapid connection coupling, where the outlet valve is opened at first by pushing the rapid connection coupling on to a connection nipple, then with further movement of a control lever, the jaws are closed and finally the inlet valve is opened. The control lever engages via an eccentric shaft with the sliding sleeve for actuating the jaws and also with a central sealing piston, which also opens up the fluid inlet after completed connection of the plug-in coupling. Although this provides a particularly reliable connection facility, the structure of this coupling is relatively expensive in account of the many components. In addition handling is relatively complicated since actuation of the control lever is necessary as well as plugging in the coupling, so that one-handed operation is hardly possible.

Such a rapid connector is further known from WO-A 93/20378 of the applicants, especially for charging from gas cylinders, wherein a rapid connection arrangement is provided in the region of the outlet, in the form of jaws with an engagement profile. A hollow sealing piston sliding in the coupling housing is also described here and is connected through an actuating device coupled to a sliding sleeve for closing and opening the jaws. Separate actuation of the actuating device in the form of a lever is also necessary here, so that handling of this rapid connector is also susceptible of improvement.

Accordingly the invention is based on the object of providing a rapid connection coupling of the kind initially described which facilitates reliable and especially simple handling with a simple structure.

This object is met by a rapid connection coupling according to the features of claim 1. Preferred developments of the invention are the subject matter of the dependent claims.

The proposed rapid connection coupling is distinguished by a small parts count, simple manufacture and an especially simple operation, which is in addition particularly reliable. In particular, in the preferred embodiment for charging air-conditioning systems with coolant, escape of the gas or liquid coolant is reliably avoided when connecting or releasing the rapid connection coupling. This is especially important for protection of the environment, since fluorinated/chlorinated hydrocarbons are frequently used in such air-conditioning systems. With the connection couplings in use today a substantial volume of gas is lost in each charging operation, which is present in the hose between the refill gas cylinder and the connection coupling and can escape when coupling up or uncoupling.

It should be noted that the proposed rapid connection coupling is suitable for various connections, in particular for connection nipples with an external thread. However other profile shapes such as grooves or beads on the connection nipple can be provided for connection of the coupling, the opposed jaw shape being correspondingly formed. By means of the sealing piston slidably movable in the housing reliable engagement of the jaws is facilitated, since the engagement profile of the jaws automatically interlocks with the turns of the thread or other suitable mating engagement profile through the slight ability to move of the sealing piston. This is especially important since the corresponding connection nipple, e.g. for an air-conditioning system, can be of relatively simple construction and nevertheless because of the slight ability of the sealing piston to move axially between the engagement profile of the jaws and the sealing surface, the rapid connection coupling engages reliably in the connection profile of the connection nipple. In addition excessive wear or damage to the connection profile both on the coupling side and the nipple side is reliably avoided.

The realisation of the rapid connection coupling by means of an outer sliding sleeve is especially important, so that reliable and rapid one-handed operation of the rapid connection coupling is facilitated in an especially simple manner.

An embodiment will be described and explained in more detail below with reference to the accompanying drawings, in which.

Figure 1:
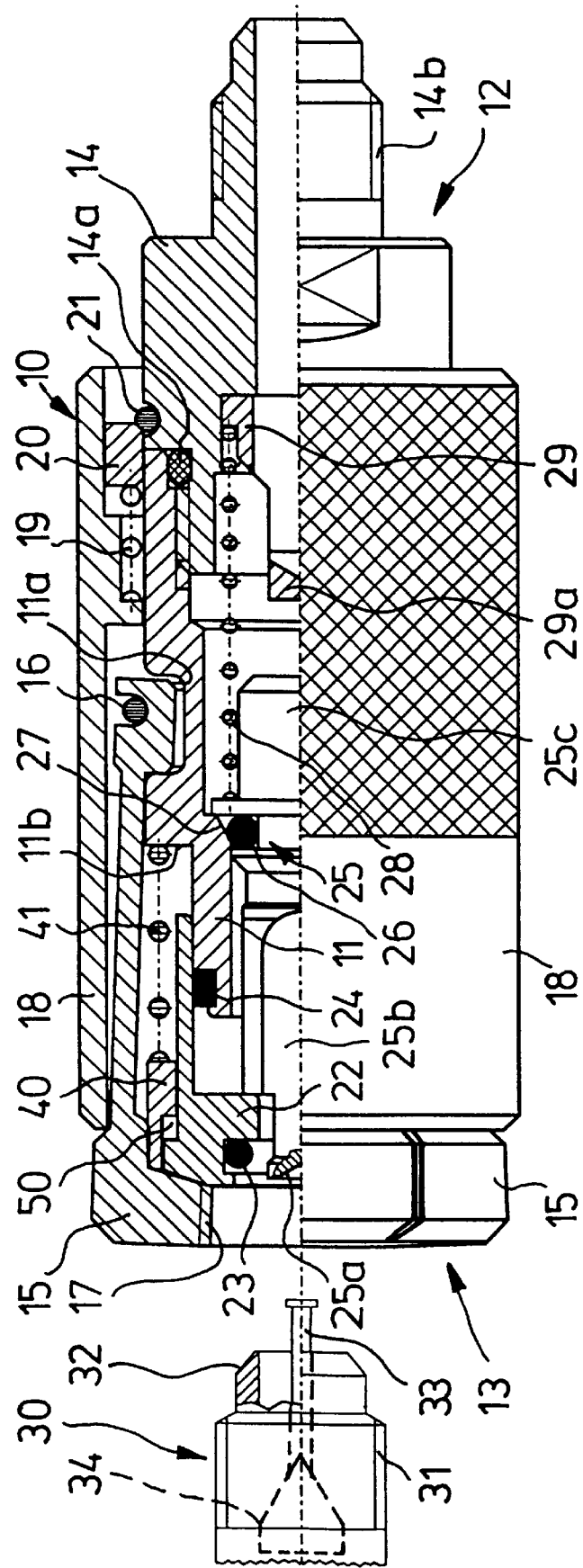
FIG. 1 is a side view of a rapid connection coupling for a connection nipple with an external thread as the connection profile, wherein the rapid connection coupling is shown in longitudinal half section and in the position shortly before connection.

A preferred embodiment of a rapid connection coupling 10 is shown in FIG. 1, shortly before the connection to a connection nipple 30. The rapid connection coupling 10 comprises a tubular housing 11, where the right end here serves as the inlet 12 and the left end as the outlet 13 for feeding on the transferred fluid to the connection nipple 30. The inlet 12 to the housing 11 has a connection adaptor 14, which is screwed into the housing 11 and is sealed relative to the housing 11 by a seal 14a. The connection adaptor 14 also comprises a thread 14b at its end here on the right, to which a hose or a pipeline for supplying the transferred fluid can be connected. The connection adaptor 14 can be designed to match the fluid to be transferred, especially the currently desired feed angle, through-flow cross-section, etc.

On the end opposite the connection adaptor 14, here the outlet 13, there are provided several jaws 15 arranged in tubular form and which are radially spread in the position shown here shortly before plugging on to the connection nipple 30, as is also shown in the previously recited WO-A 93/20378 for example. The elongated jaws 15, of which at least three and in general six jaws are arranged around the housing 11, are hooked in an annular groove 11a of the housing 11 at their ends here on the right and are biased by an annular spring 16 so that the jaws 15 are radially spread. At the end here to the left, on the inwardly offset surface, the jaws 15 each have an interlocking engagement profile 17 formed in correspondence with the connection profile 31 of the connection nipple 30, so that in the design with an external thread on the connection nipple 30, a correspondingly formed inner thread is opposed on the radially inwardly directed surfaces of the engagement profile 17.

An outer sliding sleeve 18 is provided around the jaws 15 and is guided on the cylindrical outer surface of the housing 11 and is biased by a relatively weak compression spring 19 in the direction of the connection nipple 30. The compression spring 19 abuts the connection adaptor 14 or the housing 11 via an abutment ring 20 and a circlip 21.

A sealing piston 22 is guided on the peripheral surface of the housing 11 disposed towards the outlet 13 and comprises a sealing ring 23 at its front end for engagement on a conically-formed sealing surface 32 of the connection nipple 30. The sealing piston 22 is sealed relative to the jaws 15 by means a sealing ring 24 fitted on the front end of the housing 11, so that gaseous and/or liquid fluid flowing essentially along the central axis of the plug-in coupling 10 cannot escape to the outside.

Furthermore, a check valve 25 fitted centrally in the housing 11 is of great importance and is sealed relative to a sealing surface 27 on the housing 11 by means of a sealing ring 26 in the closed position. The check valve 25 is biased by a compression spring 28, which is guided by a centering insert 29 in the connection adaptor 14 and abuts the latter. Through this check valve 25 it is ensured that the fluid fed through the connection adaptor 14 cannot flow out even with the connecting valve on the refill cylinder or the like open in the uncoupled position or just before the connection of the rapid connection coupling 10 to the connection nipple 30, as shown here.

The check valve 25 has a centrally arranged valve plunger 25b facing towards the outlet 13, with a conical centering depression 25a at the front end. On plugging the rapid connection coupling 10 on to the connection nipple 30, this centering depression 25a cooperates with a pin 33 projecting out of the connection nipple 30, whereby the pin is pressed in along the connection nipple axis on attachment and hereby actuates a check valve 34 shown in broken lines. The check valve 25 of the rapid connection coupling 10 further comprises a stem 25c opposite the centering insert 29, which serves to guide the compression spring 28 and together with a stop 29a of the centering insert 29 limits the axial stroke of the check valve 25.

Of particular importance is a sliding ring 40 which is guided on the outer periphery of the sealing piston 22 and is biased by a compression spring 41. The compression spring 41 abuts a shoulder 11b of the housing 11. As can be seen from the drawing, the end of the sliding ring 40 of narrow form facing towards the outlet 13 engages on the inner surface of the jaws 15, whereby they are held in their radially spread, open position. The sliding ring 40 is urged by the compression spring 41 against the inwardly offset region of the jaws 15, whereby a stop to the sliding movement of the sliding ring 40 on the sealing piston 22 is also effected. Since the sealing piston 22 can slide a little axially, depending on the position and engagement conditions of the engagement profile 17 in the opposed profile 31 of the connection nipple 30, a stepped entraining profile 50 is provided between the sliding ring 40 and the sealing piston 22, so that a certain capacity for relative axial movement of these two components is provided.

Figure 2:
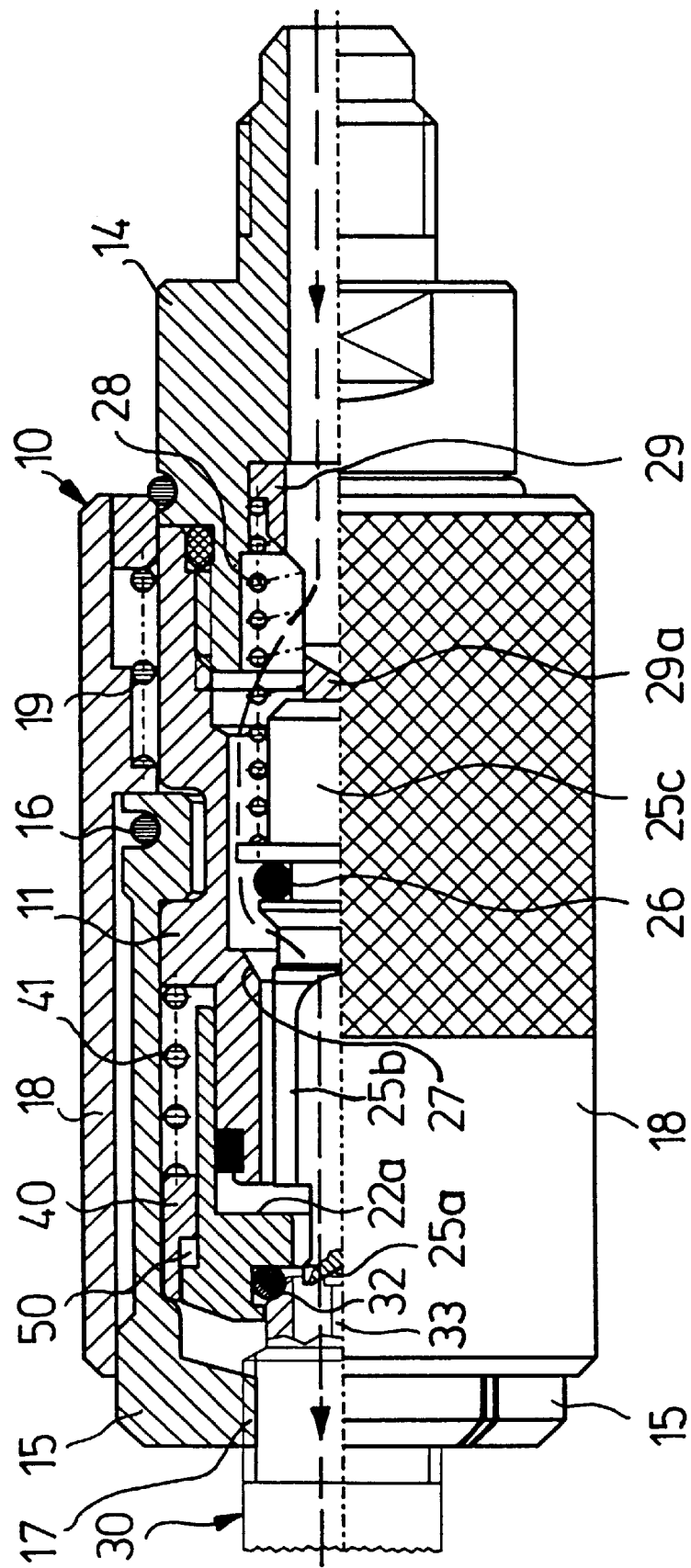
FIG. 2 is a similar view of the rapid connection coupling but in the fully connected position on the connection nipple.

The connected position of the rapid connection coupling is shown in FIG. 2. As can be seen, on plugging the rapid connection coupling 10 on to the connection nipple 30, the centering depression 25a is brought into contact with the pin 33 projecting from the connection nipple 30, so that these move substantially simultaneously in opposite directions, depending on the spring design. The sealing ring 23 also comes into engagement with the sealing surface 32, so that escape of fluid, which might arise at the check valve 34 of the connection nipple 30, is avoided. Furthermore, the sealing piston 22 is displaced to the right by the abutment of the sealing ring 23 on the sealing surface 32, until the shoulder projecting from the outer periphery in the region of the entraining profile 50 comes into engagement with the sliding ring 40. The sealing piston 22 is thereby displaced to the right together with the sliding ring 40 against the spring force of the compression spring 41. After a small movement of a few millimeters the inner surfaces of the jaws 15 bearing on the outer surface of the sliding ring 40 are freed from their blocked position, so that they can snap inwardly, so that the engagement profile 17 can engage with the correspondingly formed connection profile 31 of the connection nipple 30. Practically simultaneously the sliding sleeve 18 becomes free for axial movement to the left, since the sliding sleeve 18 is biased by the compression spring 19. By virtue of its axial movement, the sliding sleeve 18 engages over the outer ends of the jaws 15, so that they are retained interlocked in their engaged position on the connection nipple 30.

It should be noted that in the connected position shown in FIG. 2, the sealing piston 22 is axially movable in the millimeter range. It is of significant importance that there is a piston annular surface 22a, which has a greater effective area than in the region of the contacting surface between the sealing ring 23 and the sealing surface 32. Through this it is ensured that, with fluid flow as shown in broken lines substantially along the central axis of the rapid connection coupling 10, the sealing piston 22 with its sealing ring 23 is pressed even more strongly against the sealing surface 32 as the pressure increases. This provides a servo-action, i.e. a stronger force of application of the sealing ring 23 with increasing fluid pressure and thus a particularly reliable sealing of the rapid connection coupling 10.

In order to release the rapid connection coupling 10 and thus return to the open position according to FIG. 1 from the attached position according to FIG. 2 the sliding sleeve 18 is retracted manually by means of knurling or suitable profiling of the outer surface. After a short movement the jaws 15 can again spread radially, whereby the sliding ring 40 is simultaneously displaced to the left towards the outlet end 13 under the action of the compression spring 41. On account of the axial play in the region of the entraining profile 50 this sudden movement of the sliding ring 40 can take place independently of the secure engagement of the sealing ring 23 of the sealing piston 22. Thus, before the sealing contact between the sealing piston 22 and the sealing surface 32 is broken the check valve 25 is closed on account of the axial play of the valve plunger 25b relative to the piston annular surface 22 a serving as an abutment surface and the pin 33 is also allowed to project externally again, so that the check valve 34 of the connection nipple 30 is also simultaneously closed. By virtue of this practically simultaneous sequence there is a very rapid closing of the check valves, so that no volume of fluid can escape. The design of the sliding ring 40 is especially important to this, since the spreading movement of the jaws 15 is assisted by the end facing the outlet 13, so that the release of the rapid connection coupling takes place practically at a stroke, so that damage to the engagement profile 17 or the connections profile 31 is avoided. The sliding ring 40 also allows secure plugging of the rapid connection coupling 10 on to the connection nipple 30, whereby the jaws 15 are only closed when the sealing contact between the sealing surface 32 and the sealing ring 22 is ensured, since the open position of the jaws 15 is maintained until the open position of the jaws 15 is enabled by the axial displacement of the sealing piston 22 and the entrainment of the sliding ring 40 derived therefrom in direct sequence, in order to produce the connection practically at a stroke.

We claim:

1. A rapid connection coupling for transferring fluids including charging coolants in air-conditioning systems, comprising:

a tubular housing having a longitudinal axis;

an outer sliding sleeve encircling and slidably mounted relative to the housing to move along the longitudinal axis between a coupled and uncoupled position of the rapid connection coupling;

a plurality of jaws attached to the housing and which can spread radially, the jaws having an engagement profile for connection to a correspondingly formed connection nipple, the sleeve sliding over the jaws and being sized so the sleeve pushes against the jaws to urge the jaws to couple with the nipple when the sleeve is in the coupled position;

a sealing piston sliding along the longitudinal axis relative to the housing for sealing engagement with the connection nipple;

a spring-biased sliding ring sliding axially independently between the sealing piston and the jaws, the spring located so that it urges the ring to engage the jaws in the uncoupled position of the rapid connection coupling to hold the jaws in an open position, the ring being further slidably mounted to move during a coupling movement together with the sealing piston to free the engagement with the jaws, the ring and sealing piston having correspondingly located surfaces which engage when the coupling nipple is inserted into the jaws and moves the sealing piston to achieve the coupling.

2. A rapid connection coupling according to claim 1, further comprising a compression spring acting on the sealing piston and said spring acting on said sliding ring comprises a compression spring.

3. A rapid connection coupling according to claim 2 further comprising entraining profile means for providing axial play between the sealing piston and the sliding ring.

4. A rapid connection coupling according to claim 2 wherein the sealing piston is guided on the outer surface of the housing and a piston annular surface is provided and which extends into a flowpath of the fluid passing though the coupling when in use.

5. A rapid connection coupling according to claim 4, wherein a seal is carried by the piston and the engagement of the contacting nipple with the seal carried by the piston forms an axially opposed seal having an axially opposed sealing area, and the piston annular surface has a greater effective surface than the axially opposed sealing surface.

6. A rapid connection coupling according to claim 2, wherein the sliding ring is guided on the outer surface of the sealing piston.

7. A rapid connection coupling according to claim 2, further comprising check valve means placed centrally in the housing and in sealing engagement with the housing for ensuring that fluid cannot flow the housing when the connecting nipple is in an uncoupled position or during coupling.

8. A rapid connection coupling according to claim 1 further comprising entraining profile means for providing axial play between the sealing piston and the sliding ring.

9. A rapid connection coupling according to claim 8 wherein the sealing piston is guided on the outer surface of the housing and a piston annular surface is provided and which extends into a flowpath of the fluid passing though the coupling when in use.

10. A rapid connection coupling according to claim 8, wherein the sliding ring is guided on the outer surface of the sealing piston.

11. A rapid connection coupling according to claim 8, further comprising check valve means placed centrally in the housing and in sealing engagement with the housing for ensuring that fluid cannot flow the housing when the connecting nipple is in an uncoupled position or during coupling.

12. A rapid connection coupling according to claim 1 wherein the sealing piston is guided on the outer surface of the housing and a piston annular surface is provided and which extends into a flowpath of the fluid passing though the coupling when in use.

13. A rapid connection coupling according to claim 12, wherein a seal is carried by the piston and the engagement of the contacting nipple with the seal carried by the piston forms an axially opposed seal having an axially opposed sealing area, and the piston annular surface has a greater effective surface than the axially opposed sealing surface.

14. A rapid connection coupling according to claim 12, wherein the sliding ring is guided on the outer surface of the sealing piston.

15. A rapid connection coupling according to claim 12, further comprising check valve means placed centrally in the housing and in sealing engagement with the housing for ensuring that fluid cannot flow the housing when the connecting nipple is in an uncoupled position or during coupling.

16. A rapid connection coupling according to claim 15, wherein the piston annular surface is opposite a valve plunger of the check valve.

17. A rapid connection coupling according to claim 1, wherein the sliding ring is guided on the outer surface of the sealing piston.

18. A rapid connection coupling according to claim 1, further comprising check valve means placed centrally in the housing and in sealing engagement with the housing for ensuring that fluid cannot flow the housing when the connecting nipple is in an uncoupled position or during coupling.

19. A method for rapid connection coupling for transferring fluids including charging coolants in air-conditioning systems, the coupling having a tubular housing with an outer sliding sleeve slidably mounted relative to the housing, the coupling having a plurality of jaws attached to the housing so the jaws can be spread radially, with the jaws having an engagement profile for connection to a correspondingly formed connection nipple, comprising the steps of:

slidably mounting a spring-biased sliding ring between the sealing piston and the jaws;

sliding the ring to engage the jaws in an uncoupled position of the rapid connection coupling to hold the jaws in an open position; and slidably mounting the ring to move during the coupling movement together with the sealing piston to free the engagement with the jaws.

20. A rapid connection coupling for transferring fluids such as charging coolants in air-conditioning systems, comprising:

a tubular housing;

jaws means attached to the housing for spreading radially to connect to a connection nipple;

sliding sleeve means mounted outside the housing for moving the jaws into a coupled position and locking them in that position, and for unlocking the jaws to permit uncoupling;

sealing piston means sliding relative to the housing for forming a sealing connection with the connection nipple in the coupled position;

sliding ring means interposed between the sealing piston means and the jaws means to hold the jaw means in an uncoupled position and cooperating with the piston means to free the jaw means for movement to a coupled position; and check valve means in the housing for preventing fluid flow through the housing when the jaws are in an uncoupled position and during coupling.

* * * * *